(12) United States Patent
Meijer et al.

(10) Patent No.: US 7,627,594 B2
(45) Date of Patent: Dec. 1, 2009

(54) RUNTIME SUPPORT FOR NULLABLE TYPES

(75) Inventors: Henricus Johannes Maria Meijer, Mercer Island, WA (US); Anders Hejlsberg, Seattle, WA (US); Dinesh Chandrakant Kulkarni, Sammamish, WA (US); Vance P. Morrison, Kirkland, WA (US); John Joseph Duffy, Renton, WA (US); Christopher W. Brumme, Mercer Island, WA (US); Matthew J. Warren, Redmond, WA (US); Luca Bolognese, Redmond, WA (US); Peter A. Hallam, Seattle, WA (US); Gary S. Katzenberger, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 11/214,583

(22) Filed: Aug. 29, 2005

(65) Prior Publication Data
US 2006/0053138 A1  Mar. 9, 2006

(51) Int. Cl.
*G06F 17/00* (2006.01)
(52) U.S. Cl. .............................. 707/101; 707/4; 707/5; 707/104.1; 707/200; 717/114; 717/120; 717/140
(58) Field of Classification Search .................... 707/4, 707/5, 101, 104.1, 200; 717/114, 120, 140
See application file for complete search history.

(56) References Cited

U.S. PATENT DOCUMENTS

| 6,272,488 | B1 | 8/2001 | Chang et al. | |
|---|---|---|---|---|
| 6,321,374 | B1 | 11/2001 | Choy | |
| 6,385,769 | B1 | 5/2002 | Lewallen | |
| 6,405,363 | B1 | 6/2002 | Carlson et al. | |
| 7,082,455 | B2* | 7/2006 | Hu et al. | 709/203 |
| 7,318,075 | B2* | 1/2008 | Ashwin et al. | 707/203 |
| 2004/0046787 | A1* | 3/2004 | Henry et al. | 345/744 |
| 2004/0194058 | A1* | 9/2004 | Meijer et al. | 717/116 |
| 2005/0177581 | A1* | 8/2005 | Sezgin et al. | 707/100 |
| 2005/0182800 | A1* | 8/2005 | Ashwin et al. | 707/203 |
| 2006/0015528 | A1* | 1/2006 | Hejlsberg et al. | 707/104.1 |
| 2006/0053131 | A1* | 3/2006 | Meijer et al. | 707/101 |
| 2006/0085342 | A1* | 4/2006 | Chen et al. | 705/50 |
| 2006/0085400 | A1* | 4/2006 | Minore et al. | 707/3 |
| 2007/0050380 | A1* | 3/2007 | Meijer et al. | 707/100 |
| 2008/0141266 | A1* | 6/2008 | Hunt et al. | 718/106 |

OTHER PUBLICATIONS

C# Version 2.0 Specification, Published: May 2004 by Microsoft Corporation, pp. 1-100.*
U.S. Appl. No. 10/935,247, filed Sep. 7, 2004, Hejlsberg, et al.

(Continued)

*Primary Examiner*—Jean B. Fleurantin
*Assistant Examiner*—Phong Nguyen
(74) *Attorney, Agent, or Firm*—Workman Nydegger

(57) ABSTRACT

The subject disclosure pertains to systems and methods for supporting null capabilities for general purpose programming languages. Low level, runtime support for a nullable type is provided to ensure consistency and coherency. An execution component restricts support of the nullable type to programming language types that lack a null capability. The execution component may also provide support for conversion between the nullable type and a reference type.

14 Claims, 12 Drawing Sheets

OTHER PUBLICATIONS

M. Hofmann and B.C. Pierce. A Unifying Type-theoretic Framework for Objects. Journal of Functional Programming, Cambridge University Press, 1993. 42 pages.

Jurg Gutknecht. Oberon as an Implementation Language for COM Objects. Microsoft Research, 1998. 22 pages.

G. Bracha, M. Odersky, D. Stoutamire, and P. Wadler. Making the Future Safe for the Past: Adding Genericity to the Java Programming Language. Proceedings of the 13th ACM SIGPLAN Conference, pp. 183-200, 1998.

M. Fahndrich and K.R.M. Leino. Declaring and Checking Non-null Types in an Object-Oriented Language. Proceedings of the 18th ACM SIGPLAN Conference, pp. 302-312, 2003.

Meijer, et al. Unifying Table, Objects and Documents. Published 2003, pp. 1-11.

* cited by examiner

RUNTIME SUPPORT FOR NULLABLE TYPES

CROSS-REFERENCE TO RELATED APPLICATIONS

This application is related to co-pending U.S. application Ser. No. 10/935,247, entitled, "GENERAL PROGRAMMING LANGUAGE SUPPORT FOR NULLABLE TYPES", filed on Sep. 7, 2004. The entirety of the aforementioned application is incorporated herein by reference.

BACKGROUND

As programming approaches and foundations have evolved, application programming interfaces (APIs) and programming schemas have been developed to standardize and unify programming methodologies that were previously multi-variant and relatively incompatible. Modern programming therefore often involves employing APIs and schemas in conjunction with reusable libraries. Unfortunately, this evolution has inadvertently created many inefficient programming artifacts that are actually spread and perpetuated by these standardizations programming constructs. For example, one resulting software programming artifact is a duality between reference types and value types.

Reference types are variables that are stored on a heap and referenced by a pointer stored on the stack. Value types are variables that are stored directly on the stack. Consequently, variables that are represented as reference types can be uninitialized (termed "null"), but variables that are represented as value types cannot be established in an uninitialized condition without risking indeterminate or even catastrophic results. This nullification issue can present problems in a myriad of situations, including data base accessing.

Support for nullability across all types, including value types, is essential when interacting with null supported languages, such as database languages (e.g., SQL). A database language may use a null value to indicate that the actual data value is unknown or missing. By providing null support within a general purpose programming language null-supported languages and programming languages may be integrated (e.g., code in the C# programming language may read, write or interpret nullable fields in a database language).

General purpose programming languages have historically provided little or no null support. Many approaches exist for handling nulls and value types without direct language support, but all have shortcomings. For example, one approach is to use a "special" value (such as −1 for integers) to indicate null, but this only works when an unused value can be identified. Another approach is to maintain Boolean null indicators in separate fields or variables, but this does not work well for parameters and return values. A third approach is to use a set of user-defined nullable types, but this only works for a closed set of types.

Certain general purpose programming languages supply a nullable type (e.g., C# 2.0) to provide for nullability across all types, including value types. A nullable type may be implemented using a multi-element structure containing a Boolean null indicator and an element which contains the value of the instance of the nullable type when the instance of the nullable type does not represent null. Although the nullable type provides a method for setting a value type to null, the structure used to implement the nullable type is itself an instance of a value type. Use of a structure that is inherently an instance of a value type to represent an instance of a reference type leads to inconsistent and counterintuitive results under certain circumstances.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns null support for general purpose programming language types. Typically, support is provided using a nullable type including an underlying value and an indicator value. The indicator value indicates whether the value of the instance of the nullable type represents a null. In one aspect of the subject matter disclosed herein, low-level, runtime support for the nullable type is provided. This low-level support increases coherency.

The disclosed subject matter provides for the conversion between the nullable type, which is a value type, and reference type. An instance of the nullable type is unwrapped to allow access to the elements of the instance of the nullable type. The elements, the underlying value and the indicator value, are used to create an instance of a reference type.

Support of nullable at the runtime level eliminates seeming inconsistencies. Elimination of these inconsistencies increases programming language predictability and usability for software developers. In addition, the provision of support for the nullable type at a low-level allows for use of the nullable type in multiple programming language environments.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
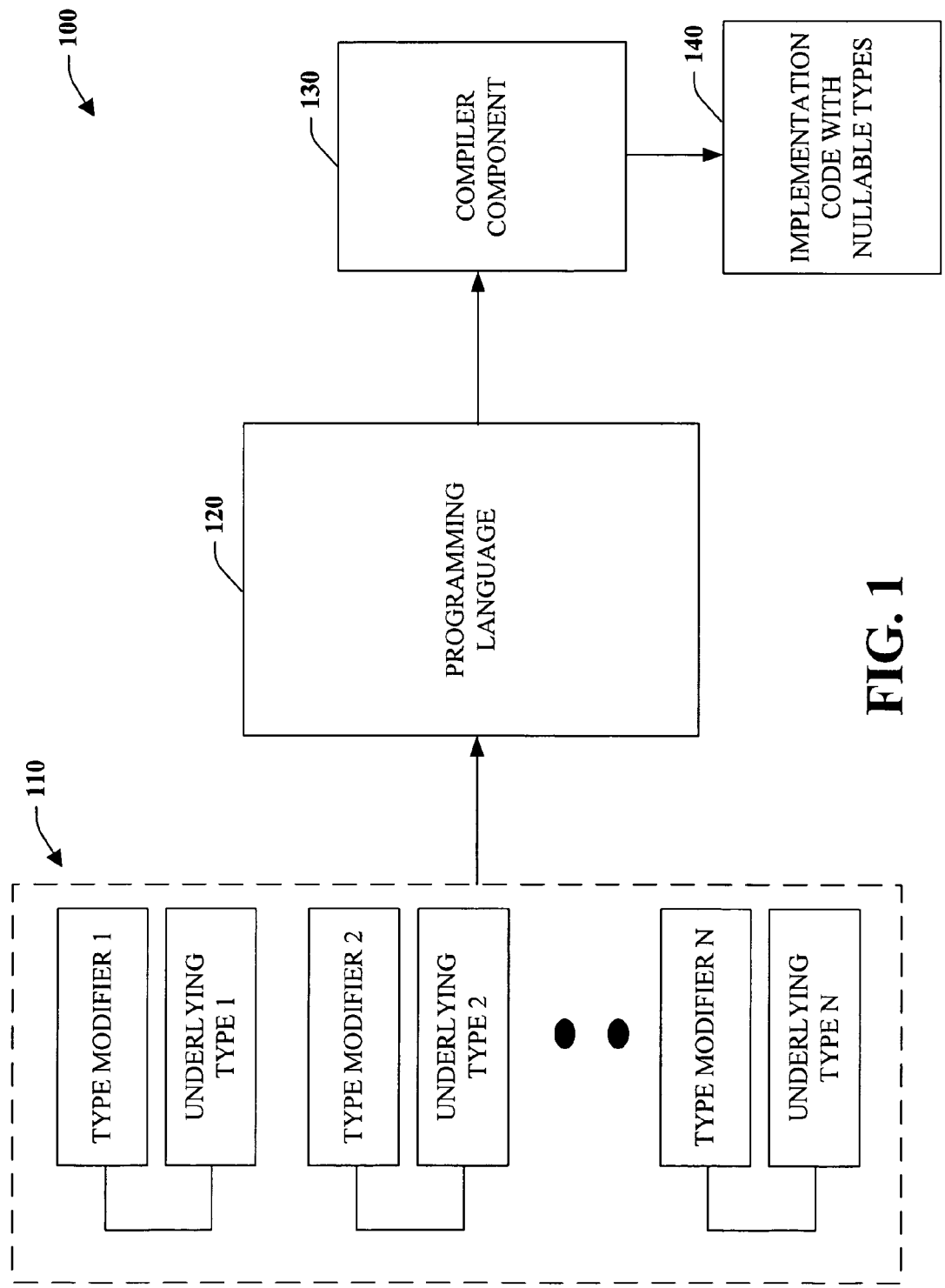
FIG. 1 is a block diagram of a system for providing nullable type support for programming languages.

The various aspects of the subject matter are now described with reference to the drawings, wherein like reference numerals are used to refer to like elements throughout. In the following description, for purposes of explanation, numerous specific details are set forth in order to provide a thorough understanding of the claimed subject matter. It may be evident, however, that the subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. In addition, while the examples provided utilize the C# programming language, numerous alternative programming languages may be used (e.g., C, C++, C#, Pascal, Python, Ruby, Visual Basic, Java, and so forth).

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 provides a nullable type support for programming languages in accordance with an aspect of the claimed subject matter. The system 100 includes one or more data structures 110 that can be declared in the context of a programming language 120 such as C, C++, C#, Pascal, Python, Ruby, Visual Basic, Java, and so forth. The data structures 110 generally consist of an underlying type such as an integer, float, Boolean, and so forth that can be declared to be a nullable type by associating a type modifier with the underlying type. For instance, a symbol such as "?" can be employed as a type modifier to indicate to a compiler component 130 that the underlying type is to be considered a nullable type. It is to be appreciated that various other symbols can be employed as the type modifier. Alternatively, an underlying type may be declared a nullable type by associating the word nullable with the underlying type (e.g., Nullable<int>). The expressions T? and nullable<T>, where T is a programming language type, may be used interchangeably herein. Upon declaration and compilation, implementation code 140 (e.g., executable, intermediate language . . . ) can be generated via the compiler component 130 including nullable and non-nullable types, if desired by the software developer.

Figure 2:
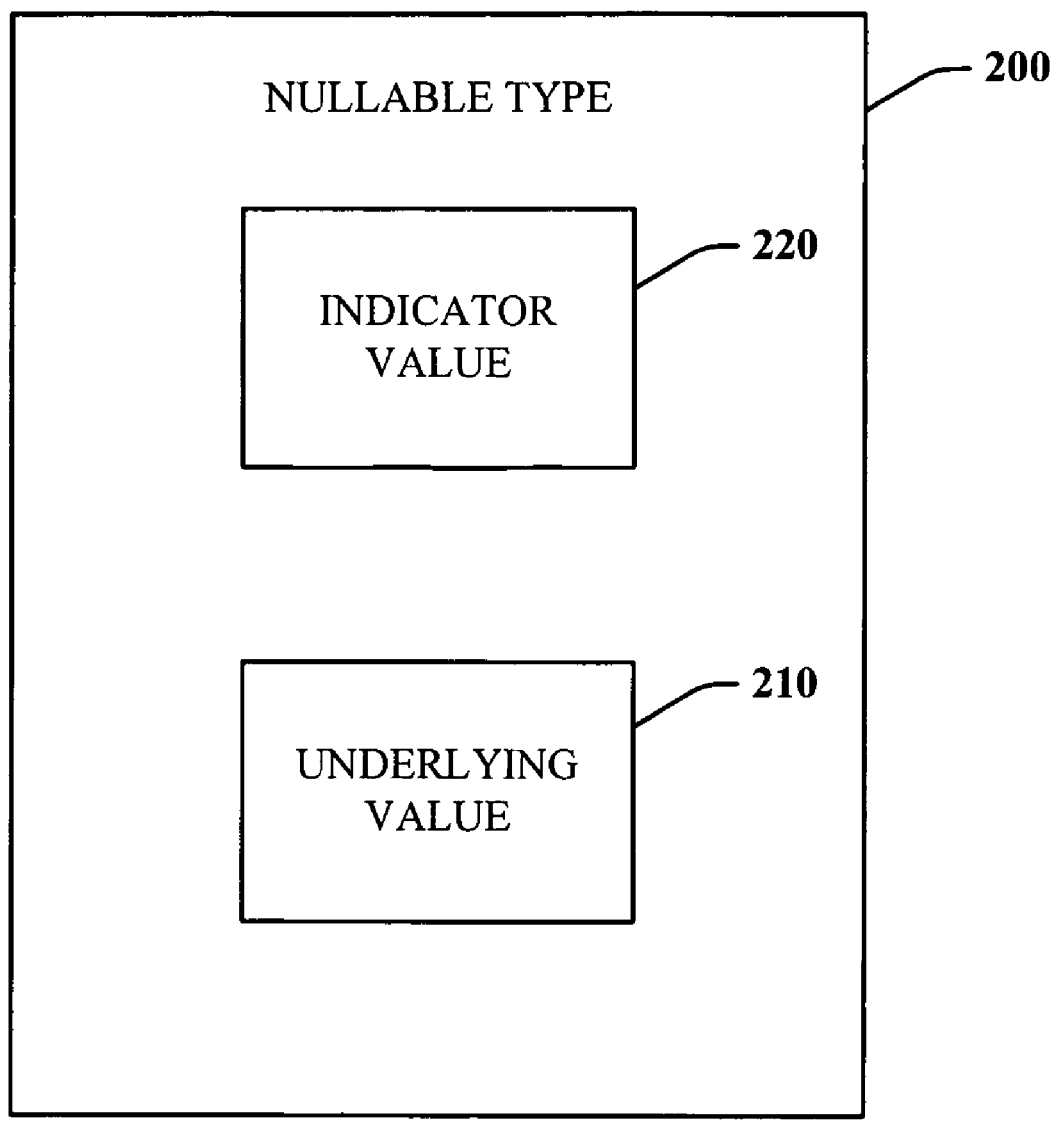
FIG. 2 is a block diagram of a nullable type.

Referring now to FIG. 2, an instance of a nullable type may be set to any value available for the underlying type and the null value. A nullable type 200 may include an underlying value 210 containing the value of the underlying type and an indicator value 220. The indicator value signals when the value of the instance of the nullable type is null. An instance of the nullable type may be implemented by automatically creating a multi-element structure including an element for the underlying value 210 and a Boolean element for the indicator value 220, representing whether or not the underlying value is null (e.g., flag indicating null or non-null value for the underlying type). If the Boolean element is declared false for example, the underlying type is considered null, whereas if the Boolean element is true for example, the value contained in the underlying value is considered the value of the instance of the nullable type.

Generally, nullable types are constructed using the ? type modifier (or other symbol). For example, int? is a nullable form of the predefined type int. A nullable type's underlying type should be a non-nullable value type. Consider the following exemplary declaration of the nullable type:

```
public struct Nullable<T> where T : struct
{
    internal T value;
    internal bool hasValue;
    public Nullable(T value) {
        this.value = value;
        this.hasValue = true;
    }
    public bool HasValue {
        get {
            return hasValue;
        }
    }
    public T Value {
        get {
            if (!hasValue) {
                throw new InvalidOperationException( );
            }
            return value;
        }
    }
}
```

As shown in the exemplary code, an instance of the nullable type may have two public read-only properties, value and hasValue. The property hasValue is of type bool and signals that the nullable type has a value of null. For example, hasValue is true for a non-null instance and false for a null instance. The property value is of the nullable type's underlying type T. The nullable type includes two methods Value and HasValue that can be used to test the null status and retrieve the value. The method HasValue returns the hasValue property. When hasValue is true, the Value method returns the contained value. When hasValue is false, an attempt to access the value property throws an exception.

The exemplary nullable type also includes a public constructor that takes a single argument of type T. The constructor initializes an instance of a nullable type. For a non-null instance of T? the value property is set to the value of T and the hasValue property is set to true. The constructor for the nullable type should not permit nesting of nullable types. The value property should not be set to null.

In general, a non-nullable value type may be implicitly converted to a nullable form of that value type. Furthermore, an implicit conversion can exist from the null literal to any nullable type. For example:

```
int? x = 123;
int? y = null;
if (x.HasValue) Console.WriteLine(x.Value);
if (y.HasValue) Console.WriteLine(y.Value);
```

In the first two lines of the above example, the integer value 123 and the null literal are implicitly converted to the nullable type int?. The example code would result in the first Console.WriteLine executing for x and outputting 123. However, the second Console.WriteLine would not execute since y.HasValue would return false.

The type specified before the ? modifier or within the "<>" for a nullable type is referred to as the underlying type of the nullable type. The underlying type of a nullable type can be any non-nullable value type. Typically the underlying value cannot be a reference type or a nullable type. For example, int? and double? are valid nullable types, but string? and int?? are generally not. A nullable type can represent all values of its underlying type plus an additional null value. The syntax T? is shorthand for System.Nullable<T>, and the two forms can be used interchangeably.

The term wrapping, as used herein, denotes the process of packaging a value of type T, in an instance of a type of the form nullable<T>. Conceptually, a value x of type T is wrapped to type T? by evaluating the expression new T?(x). The term unwrapping denotes the process of obtaining the value of type T, contained in an instance of a type of the form nullable<T>. Conceptually, a value x of type T? is unwrapped to type T by evaluating the expression x.value. Attempting to unwrap a null instance may cause an exception to be thrown.

Certain programming languages provide a bridge or method for conversion between value types and reference types. For example, C# provides the boxing and unboxing instructions to convert between value types and reference types. A boxing conversion allows any value type to be implicitly converted to a reference type. Boxing an instance of a value type converts the value type instance to an instance of the object class type; the object class type is the ultimate base class of all other types in C#. Although the following examples are presented using C# any subject matter disclosed is not limited to the C# programming language. Consider the following C# code:

```
int i = 123;
object box = i;
```

Here, a value type variable, int i, is declared and set to a value of 123. An object type variable box is declared and i is boxed, or implicitly converted to the object type. Conversely, an unboxing conversion allows a reference type to be explicitly converted to a value type. For example:

```
object box = 123;
int i = (int) box;
```

Here, in the first line of the sample code, an object type variable box is declared and set to a value of 123. In the second line, an int i is declared. The value of box is unboxed or converted to an int and i is set to the value of box.

Unfortunately, boxing and unboxing of nullable type variables may cause inconsistencies. Although the nullable type provides a null value, the nullable type is in fact a value type variable. As illustrated above, the nullable type may be implemented as a multi-element structure. Therefore, when the nullable type, nullable<T> is boxed, the resulting reference type is not a null reference. Because the compiler treats the nullable<T> as a structure, boxing the nullable<T> structure results in a non-null reference to the boxed nullable<T>. This causes inconsistencies when the nullable<T> contains a null value. Consider the following exemplary C# code:

```
Nullable<int> x = null;
Console.WriteLine(x == null); // True since HasValue is false
object o = x;
Console.WriteLine(o == null); // False since o is a proper
                              reference to "null" value x
```

Here, a nullable type variable x, with an underlying type int, is set to null. Using the declaration of nullable provided above, the nullable constructor sets the Boolean property hasValue to false. Therefore, the comparison of x to null in the second line is equal to true. However, in the third line, when x is implicitly boxed to object o, the object variable o contains a reference to the null value x, rather than containing an actual null reference. Therefore, when the object variable o is compared to null in the fourth line of the example code, the comparison will return a value of False. Consequently, the result of the comparison differs depending upon whether the comparison is made using the nullable type variable or the boxed nullable type variable. This result may be counterintuitive to software developers. The problem is also apparent when an unconstrained type parameter is used rather than a type object. For example:

```
void F<T>(T x) { Console.WriteLine(x == null); }
int? x = null;
F(x); // False
```

Here, a nullable type variable x, with an underlying type of int, is set to null. The function F is called with parameter x. The unconstrained type parameter x is boxed and the result of the comparison of unconstrained type parameter is False.

As illustrated in the example above, for a value x of a type T, the chain of implicit conversions from type T to type nullable<T> to type object results in a different value than a conversion directly from type T to type object. This result leads to incoherence. Now, consider the following C# code:

```
int x = 123;
object o = x;
int y = (int?)o; // Error, must write (int?)(int)o
```

Here, an int type variable x is declared and set to a value of 123. The variable x is then boxed to an object type variable o. The third line attempts to unbox the object type to a nullable type, with an underlying integer value, and then box the nullable type to an int. However, the code as written would likely generate an error. A boxed T cannot be unboxed as nullable<T> and a boxed nullable<T> cannot be unboxed as a T. Ideally, software developers should be able to box and unbox T and nullable<T> interchangeably.

In addition, the nullable of type T does not typically implement the interfaces of the underlying type T. In general, an interface defines a set of properties, methods and events, but does not provide implementation. In particular, in C# an interface type is a partial specification of a type. All classes that inherit from the interface type must implement the methods contained in the interface type. For example:

```
struct S: IFoo {...}
S? x = new S( );
IFoo foo = x;              // Compile-time error
IFoo foo = (IFoo)x;        // Compile-time error
IFoo foo = (IFoo)(object)x; // Run-time error
IFoo foo = x.HasValue ? (IFoo)x.Value : null;
```

A struct S inherits from an interface IFoo. A nullable type variable x with an underlying type S is instantiated. The interface method IFoo is accessible only through the value element, which is of the underlying type S, of the nullable type, as shown in the last line of the exemplary code. In addition, the interface is only accessible if the nullable type variable x is not null. Consequently, only the last line of code properly utilizes the interface IFoo of struct S.

The conventional implementation of the nullable type also allows nesting of nullables. In general, the nullable type should be utilized only with underlying types that are not capable of expressing nullability themselves. Generally, taking the nullable of a reference type may be prevented by adding a constraint to the T on the nullable<T> declaration. However, this constraint would not prevent a software developer from creating nested nullable types (e.g., nullable<nullable<T>>) because nullable<T> is itself a structure and therefore a value type variable.

Figure 3:
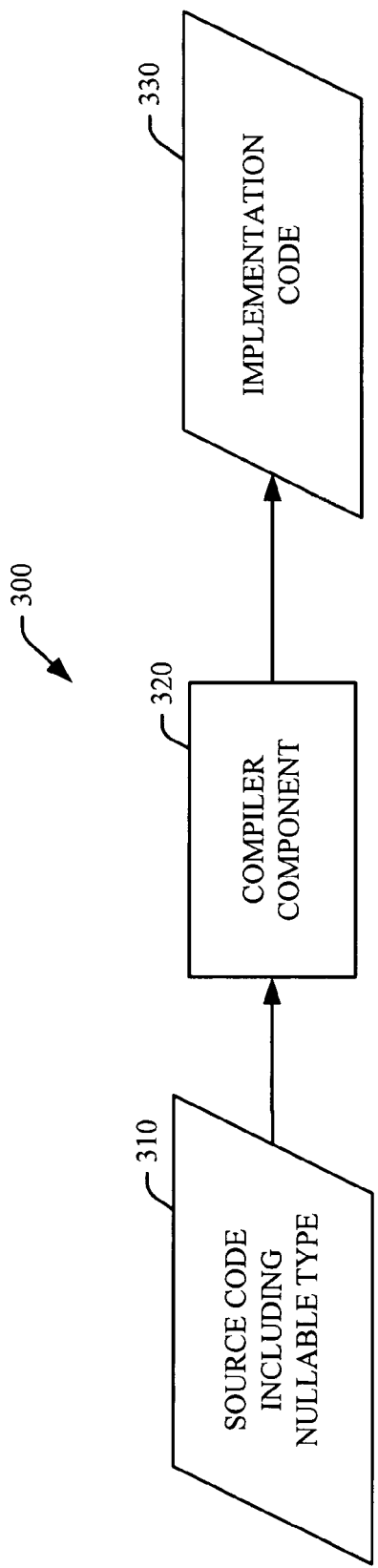
FIG. 3 is a block diagram of a system for compiling source code including the nullable type.

FIG. 3 illustrates a system 300 for implementing source code including the nullable type. The source code 310 may be in any programming language that includes the nullable type. The source code 310 is processed by a compiler component 320 Compilation produces the implementation code 330.

Figure 4A:
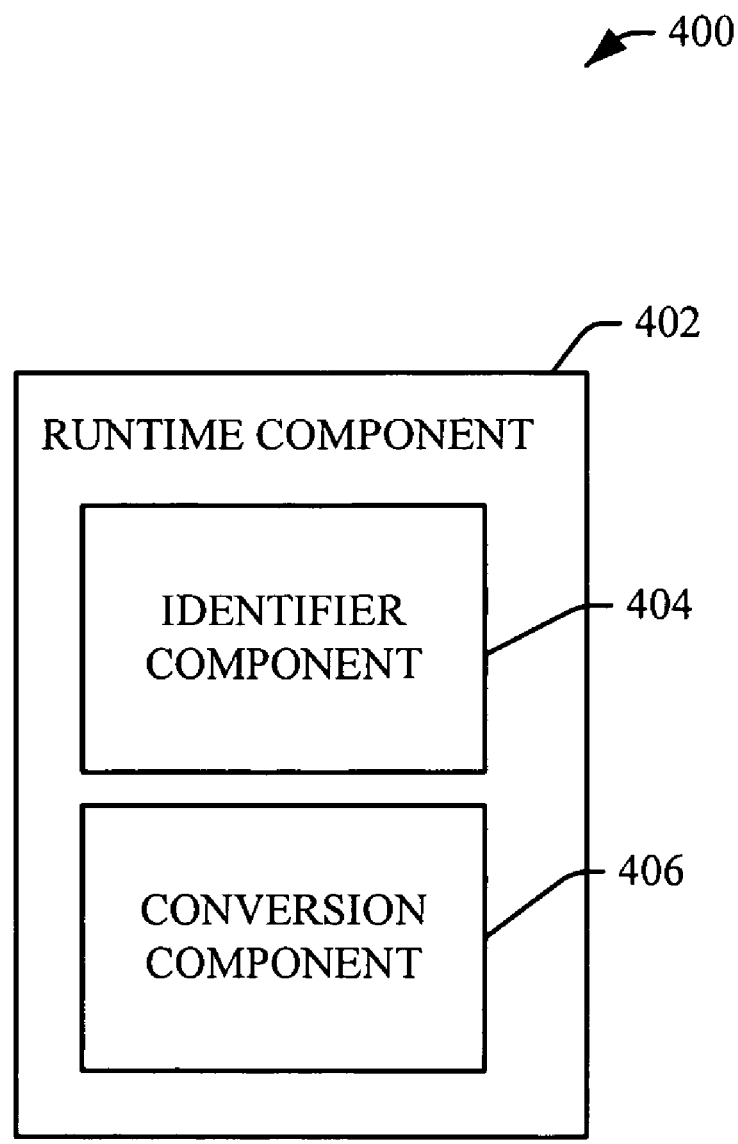
FIG. 4A is a block diagram of a runtime system that provides for the processing of nullable types.

FIG. 4A illustrates a runtime system 400 that provides for the processing of nullable types. A runtime component 402 may include an identifier component 404 and a conversion component 406. The identifier component 404 identifies instances of the nullable type. The conversion component 406 handles conversion to and from the nullable type. The identifier component 404 and conversion component 406 may be implemented by a runtime compiler or an execution engine or a combination thereof.

Figure 4B:
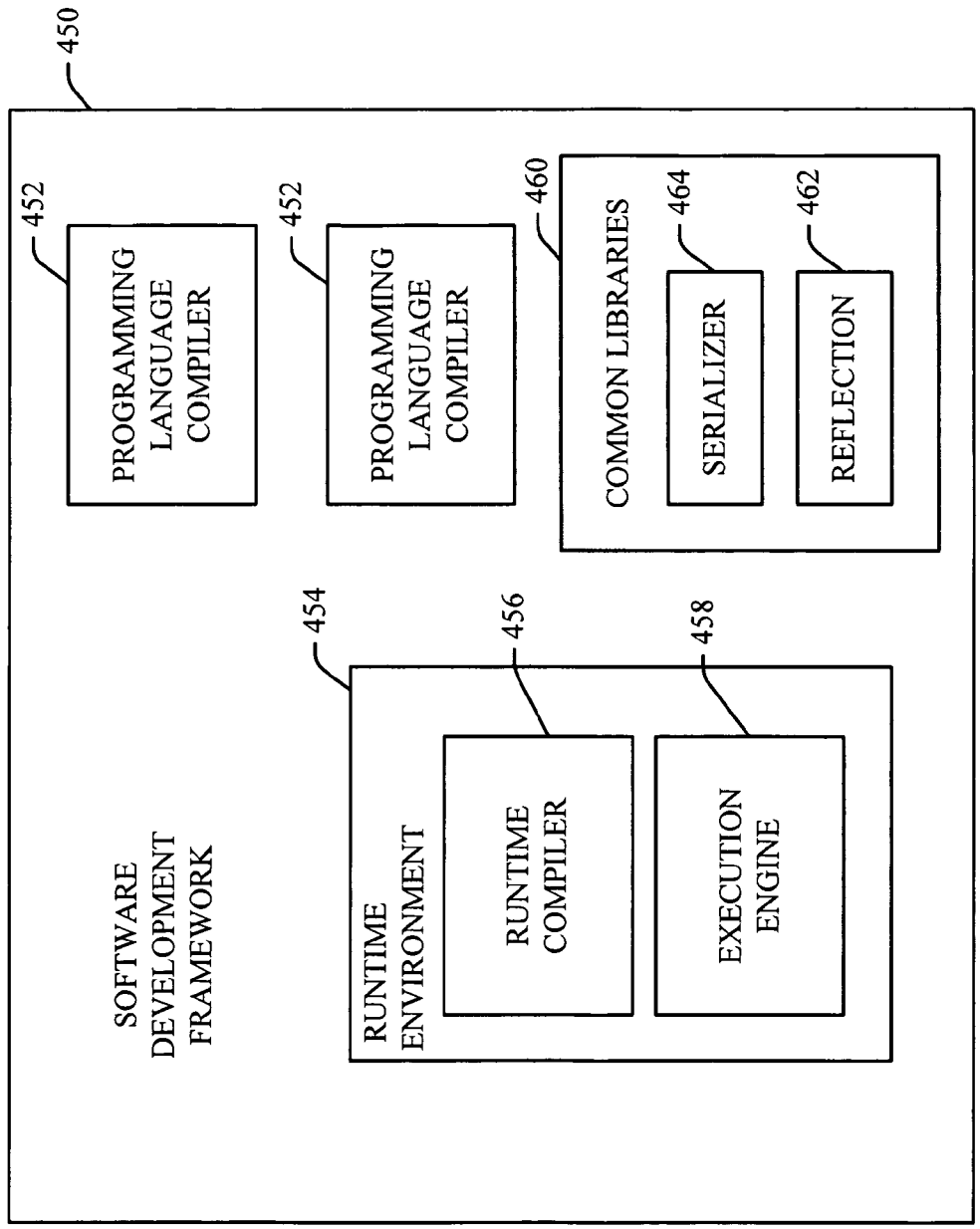
FIG. 4B is a block diagram of an integrated software development environment that provides for the processing of nullable types.

FIG. 4B illustrates an integrated software development framework 450 (e.g. NET) that provides for the processing of nullable types. The framework 450 may include one or more programming language compiler components 402 (e.g., C#, VB.Net). These compiler components 452 may be used to generate an intermediate language code (e.g., MSIL). The intermediate language code may be processed by a runtime environment, 454 (e.g., CLR) also referred to herein as the runtime component. The runtime environment 454 may include a runtime compiler component or Just In Time compiler 456 (JIT) and an execution engine 458 to process the intermediate language code. The software development framework 450 may include a set of common libraries 460, such as the System namespace. The common libraries 460 may include a reflection class 462 and serializer class 464. Full support of the nullable type may require modification of several of the elements of the software development framework 450.The above discussed inconsistencies of the nullable type may be resolved by providing deep support for the nullable type. Low-level support may be provided in the runtime environment (e.g., Common Language Runtime (CLR), Java Virtual Machine (JVM)). Low-level, execution component support for nullable types may be used to provide nullable types in a multi-language environment. Although the .Net framework and CLR runtime environment are discussed here in detail, support may be provided any runtime environment.

The low level nullable type support should recognize structures capable of representing the null value. Recognition of structures which support the null value would allow a runtime distinction between nullable types and other structures. Once the nullable type may be differentiated from other structures, including programmer defined structures, the nesting of nullable types may be prevented. Alternatively, the compiler may not allow structures to be converted into nullable types. The execution may include a special verifier rule that interprets the struct constraint as "cannot represent null", identifying the variable as a struct, but not a nullable type.

Figure 5:
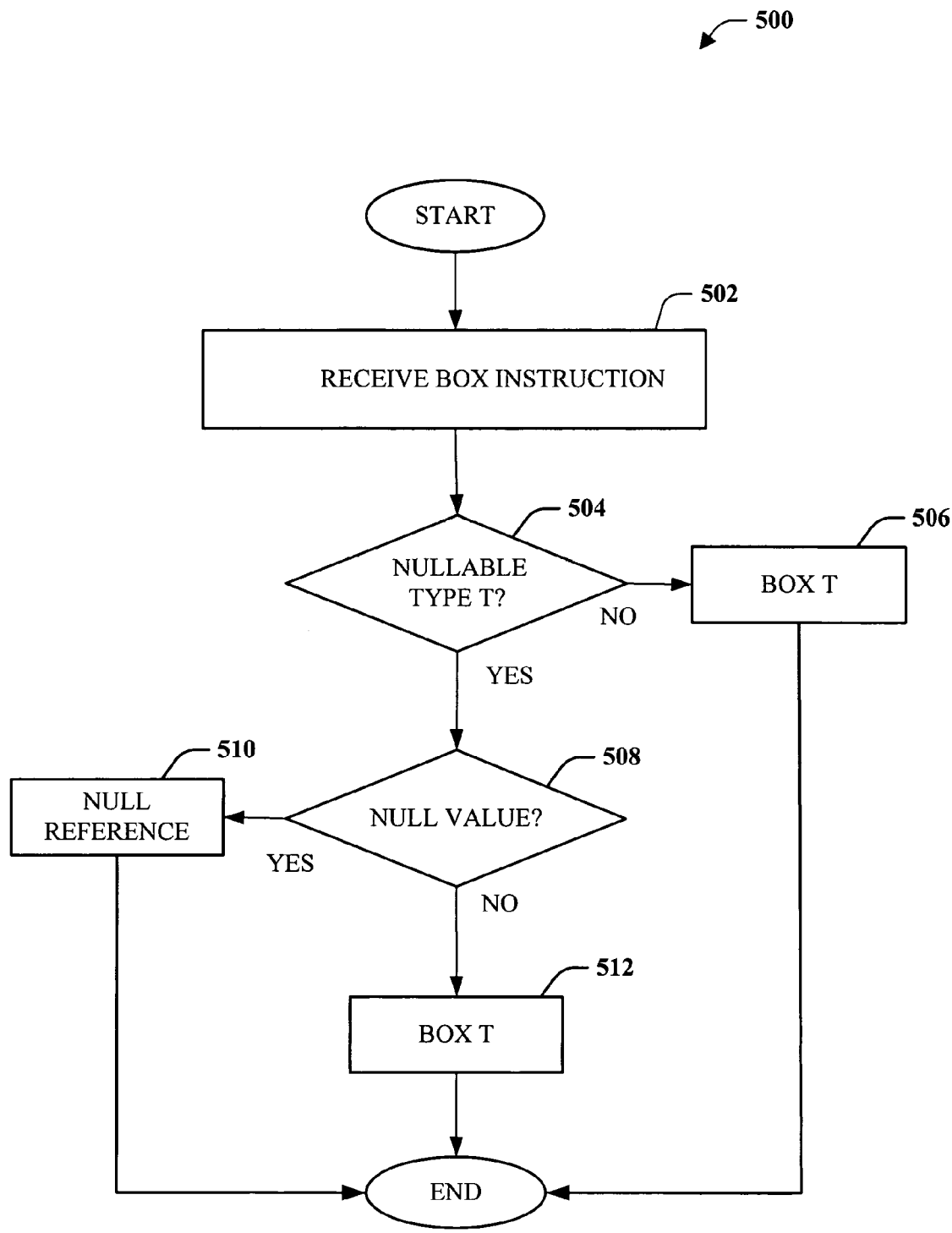
FIG. 5 is a flowchart diagram of a boxing instruction methodology.
Figure 6:
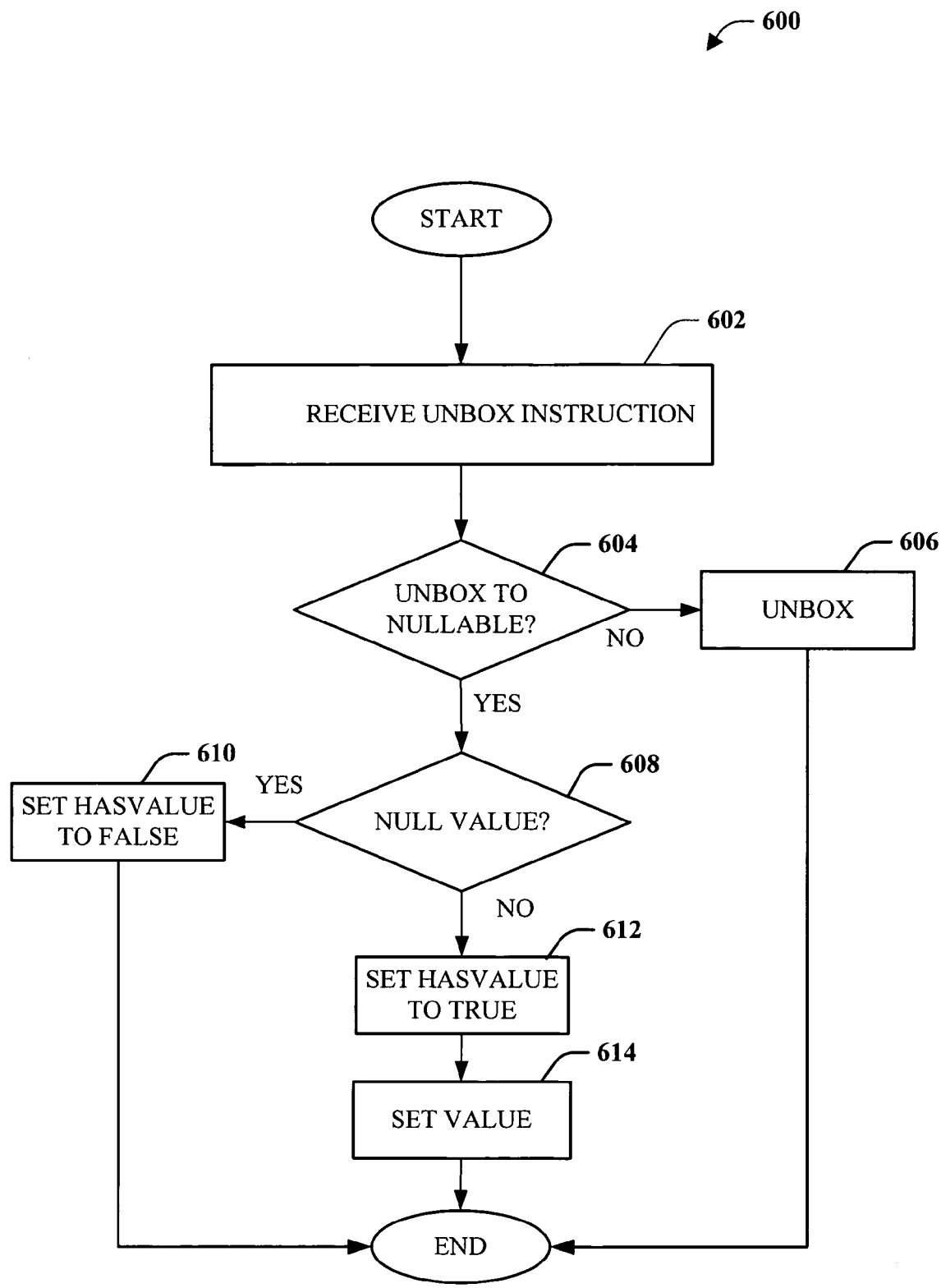
FIG. 6 is a flowchart diagram of an unboxing instruction methodology.

Referring now to FIGS. 5 and 6, the runtime environment may be modified to properly convert between a nullable type and a reference type (e.g., box and unbox the nullable type). In particular, in one aspect, the runtime compiler component, JIT, may be modified to provide the specialized box and unbox instructions. FIG. 5 illustrates a boxing instruction that recognizes and unwraps a nullable type, for example nullable<T>. Nullable<T> is mapped it to a null pointer if the value of nullable<T> is null or to a boxed, unwrapped T if the value of nullable<T> is not null. Beginning at 502, the box instruction is received. At 504, it is determined whether the variable to be boxed is a nullable type. If the variable is not a nullable type, the processing continues with the conventional boxing instruction at 506. If the variable is a nullable type, at 508 it is determined whether the value of the nullable is null. If yes, the box instruction will return a null pointer at 510. If no, the box instruction will unwrap the nullable<T> and box the instance of type T contained within the nullable<T>. Thus, boxing a non-null nullable<T> results in a boxed T. This boxing operation may be thought of as lossy. The result of boxing a nullable<T> stores no information to indicate that it was originally a nullable<T> rather than a T. The boxed representation of a nullable<T> is either a null reference or a reference to a boxed<T>. Consequently, there is no dynamic type nullable<T> and the heap never holds a nullable<T>. When the nullable<T> is boxed, it is unwrapped and the underlying value is stored on the heap, rather than the nullable<T>.

In one aspect of the disclosed subject matter, a true static boxed<nullable<T>> may still exist in the runtime. The execution engine may allocate and manage static fields on the managed heap. The static fields should be fully self-describing and therefore boxed. To avoid losing type information, a true boxed<nullable<T>> is maintained and the unbox operation will succeed in unboxing the boxed<nullable<T>> into a nullable<T>.

FIG. 6 illustrates a process for unboxing a nullable type, where a variable of type boxed<T> may be unboxed to either a T or a nullable<T>. Beginning at 602, an unboxing instruction is received. At 604 a determination is made as to whether the variable is to be unboxed to a nullable type. If no, conventional unboxing is performed at 606. If yes, a determination is made as to whether the value of the variable is null at

608. If yes, the hasValue element of the nullable<T> is set to false and the value element is set to the default value for T at 610. If no, the hasValue element of the nullable<T> is set to true at 612 and the value element is set to the value of the variable at 614.

Figure 7:
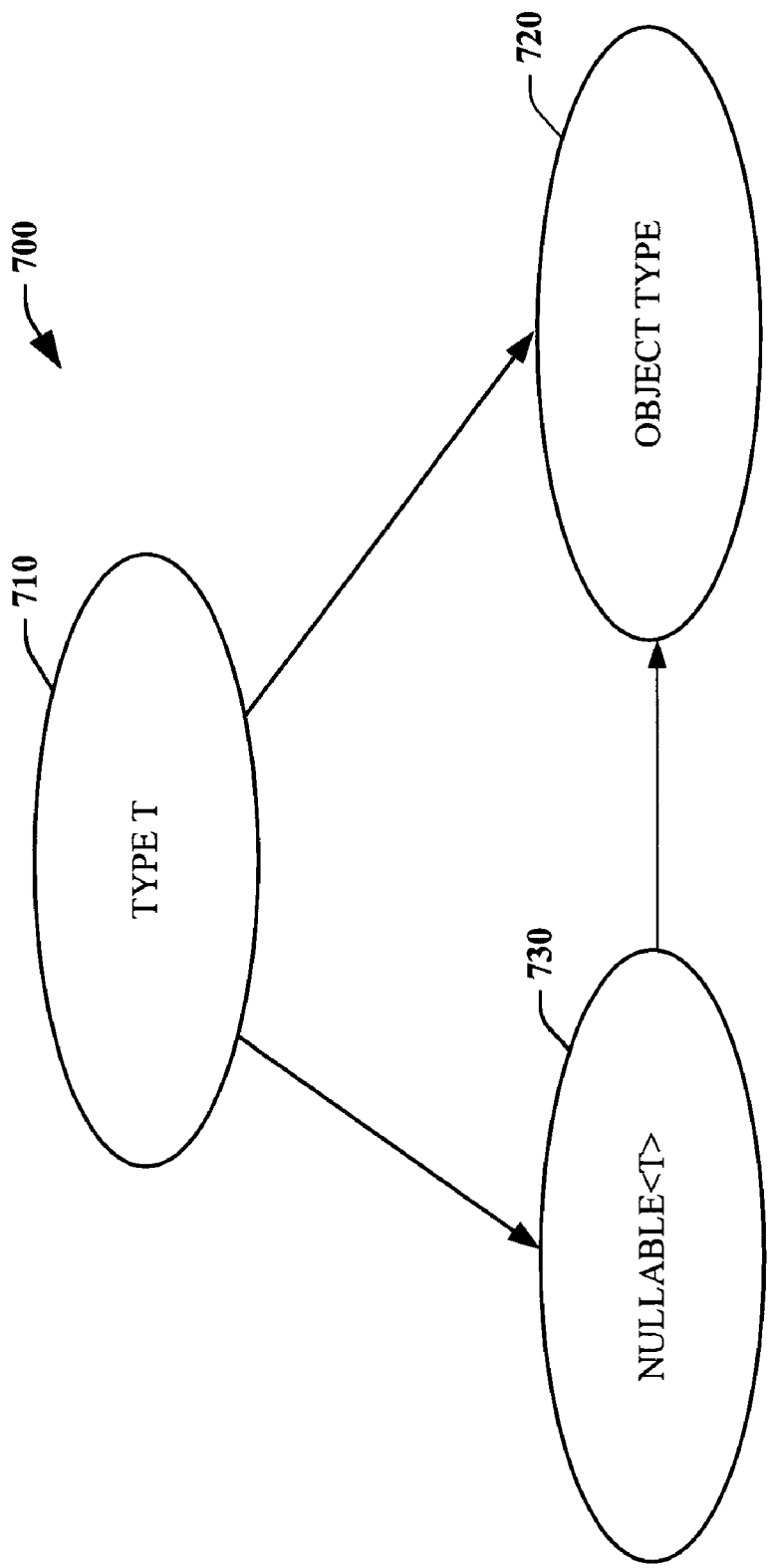
FIG. 7 illustrates a box instruction relationship for nullable types.

FIG. 7 illustrates the relationship 700 of the box instruction to a type T 710, the object type 720 and a nullable<T> 730. As discussed above, without low level support for nullable types boxing a variable of type T 710 to an object type 720 may yield different results than boxing a nullable<T> 730 to an object type 720. As shown in FIG. 7, when runtime support is provided for nullable types and the box instruction is modified as discussed above, boxing a Type T 710 to an object type 720 is equivalent to taking a nullable of type T 710 and then boxing the nullable<T> 730 to an object type 720. Therefore, a box of Type T is equivalent to a box of nullable<T>.

Figure 8:
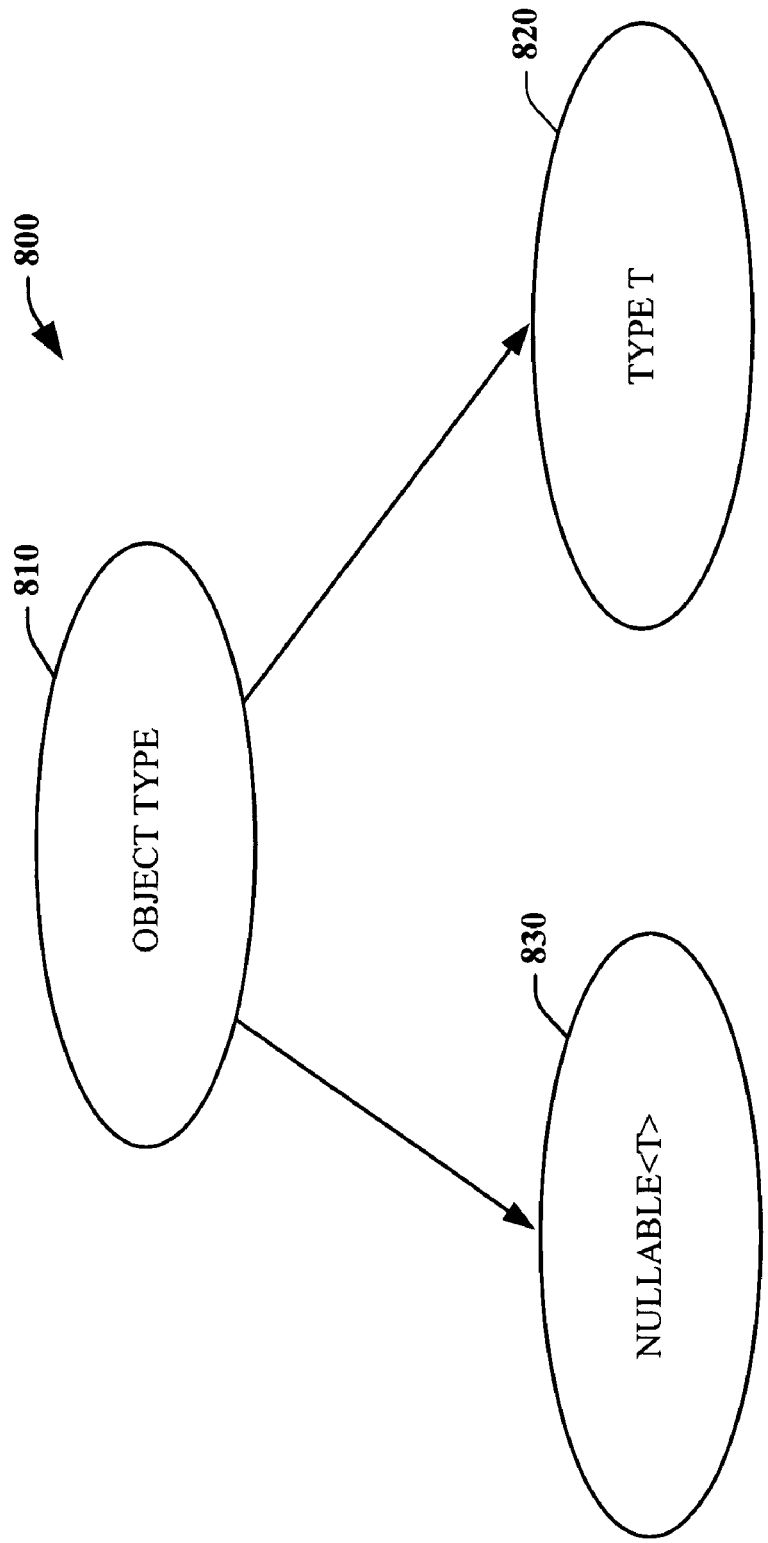
FIG. 8 illustrates an unbox instruction relationship for nullable types.

FIG. 8 illustrates the relationship 800 of the unbox instruction to the object type 810, a type T 820 and a nullable<T> 830. Now a boxed T, which is an object type 810, may be unboxed either to a type T 820 or to a nullable<T> 830. If the value of the object type boxed T 810 is null, unboxing to a nullable<T> 830 succeeds, yielding a nullable<T> 830 with a null value. If a null object type is unboxed to a type T, an exception is thrown.

To summarize, with these modifications to the box and unbox instructions it would be effectively impossible to have a boxed nullable<T>. After all, when nullable<T> is boxed, only type T is stored in the object type, or box. Therefore, a type T would have only one boxed form. In addition, a null value of type nullable<T> would always map onto a null reference. For a non-null of type nullable<T>, the value element is unwrapped and then boxed, resulting in boxed <T>. A boxed instance of T could be unboxed either as a T (which would throw an exception if boxed T was equal to null) or as a nullable<T> (which would map a null reference to a null value). The modifications of the box and unbox instructions would eliminate the confusion around boxed T and boxed nullable<T>.

In addition, the modification of the box and unbox instructions would make nullable<T> appear to implement T's interfaces when it is boxed. As discussed above, the modified boxing instruction effectively unwraps the nullable<T>. Accordingly, boxed nullable<T> is equivalent to boxed T and therefore has access to any interfaces of type T. However, it is important that all of the interfaces implemented by nullable<T> be implemented by type T. If type T does not have all of the interfaces, then when a nullable<T> is unwrapped and boxed as a type T, some of the interface implementations may be lost. One possible method for ensuring that T implements all of the interfaces of nullable<T> is to constrain T. Consider the following exemplary C# code using generic constraints:

```
public struct Nullable<T>:
    IComparable,
    IComparable<Nullable<T>>,
    IEquatable<Nullable<T>>
where T: struct,
    IComparable,
    IComparable<T>,
    IComparable<Nullable<T>>,
    IEquatable<T>,
    IEquatable<Nullable<T>>
{
    ...
}
```

Type T is constrained to implement IComparable, and IEquatable. Unfortunately, this limits the usefulness of nullable<T>. Effectively, a struct would have to be specifically authored to support use with nullable<T>. Alternatively, the CLR could automatically implement any missing interfaces for a struct.

To prevent the interface problems discussed above, the nullable<T> may be implemented without interfaces. The default comparers and equatable comparers within the runtime environment (e.g., CLR) may be altered to recognize nullable<T>s. Consider the following exemplary code:

```
internal class NullableComparer<T> : Comparer<Nullable<T>>
    where T : struct, IComparable<T>
{
    public override int Compare(Nullable<T> x, Nullable<T> y) {
        if (x.hasValue) {
            if (y.hasValue) return x.value.CompareTo(y.value);
            return 1;
        }
        if (y.hasValue) return -1;
        return 0;
    }
}
```

Here, a class NullableComparer may be added to the Comparer implementation to provide for nullable types. Similarly, the following exemplary code may be added to the EqualityComparer implementation:

```
internal class NullableEqualityComparer<T> :
EqualityComparer<Nullable<T>> where T : struct, IEquatable<T>
{
        public override bool Equals(Nullable<T> x,
            Nullable<T> y) {
            if (x.hasValue) {
                if (y.hasValue) return x.value.Equals(y.value);
                return false;
            }
            if (y.hasValue) return false;
            return true;
        }
        ....
    }
}
```

Additional modifications to the runtime environment may be required to support full nullable functionality. The runtime environment may need to provide instructions that allow inspection of the nullable type at runtime. For example, runtime instructions that test for assignment compatibility of an object with a type token T (e.g., the isinst instruction of the JIT provided by CLR) may need to be updated. The isinst instruction must have intrinsic knowledge of the nullable type to perform type checking. The isinst should leave a reference to the object on the stack to indicate success. Otherwise, a null reference is left on the stack. When the isinst instruction is successful, unboxing is not performed. The code will perform an unbox into a nullable<T> slot if necessary.

The modified runtime instruction to test for type compatibility may be utilized by general purpose programming language operators. For example, the C# operators "is" and "as" utilize the isinst operation. Accordingly, the "is" and "as" operators may be extended to handle any type that permits nullability (e.g., reference types and nullable types).

The "is" operator is used to dynamically check if the runtime type of an expression is compatible with a given type. The result of an "is" operation, "e is T", where e is an expression and T is a type, is a Boolean that indicates whether the expression may be converted to the type T by a reference conversion, a boxing conversion or an unboxing conversion. The "is" operation may need to be modified, such that the expressions "e is T?" evaluates to True when e is T or a non-null T? and False otherwise. In addition, the expression "e is T" should evaluate to True when e is T or a non-null T? and should be False otherwise.

Consider the following exemplary code:

```
int? x = null;
int? y = 10;
int z = 10;
bool b1 = (x is int?); // False; x is boxed as null, null is always false
bool b2 = (y is int?); // True; y is boxed as int, new behavior ensures this is true
bool b3 = (z is int?); // True; z is boxed as int, same as b2 (can't differentiate)
bool b4 = (y is int) && (z is int); // True; y and z are boxed as int, ordinary check applies
```

Here, a nullable type variable x, with an underlying type of int, is initialized to null. A nullable type variable y, with an underlying type of int, is initialized to 10. An int type variable z is also initialized to 10. As indicated above in the fifth line of the sample code, b1 will be set to false. The variable x is a nullable type, with a null value. Taking a nullable of a null value is not permitted. Therefore, x may not be converted to a nullable of x and b1 is set to False. In contrast, b2 will be set to true in the sixth line of the sample code. Here, the nullable type variable y is set to 10. When the nullable y is boxed, the result will be the value 10. Taking a nullable of int 10 is permitted and consequently b2 is set to True. Example b3 in the seventh line is similar to b2, in that both y and z box to an int and therefore are nullable. Accordingly, b3 is also set to True. Finally, nullable type variable y has a value 10 and may therefore be boxed to an int. Consequently, b4 is set to True.

The "as" operator is used to explicitly convert a value to a given reference type using a reference conversion or a boxing conversion. If the conversion is not possible, the resulting value is null. In an operation of the form "e as T", e must be an expression and T must be a reference type. To fully support the nullable type, the "as" instruction may need to be modified such that for the operation "e as T" T must be a reference type or a nullable type.

In addition, the runtime environment may provide a mechanism for reifying class information at runtime. As used herein, reifying runtime values allows developers to view and manipulate runtime values. For example, the .NET framework includes Reflection. Reflection is provided through a set of base classes in the System.Reflection namespace and allows developers to view and manipulate values in the CLR using an object model. Reflection may be used to programmatically call methods, inspect objects and determine the available methods and members of certain objects. Because Reflection views and manipulates data types it requires information regarding available types, including the nullable type. Although this has been discussed particularly with the .Net and Reflection, any such mechanism should have the ability to handle the nullable type.

The set of Reflection APIs provided to the programmers uses a series of function calls (fcalls) RuntimeMethodHandle._InvokeMethodFast, _ConstructorInvoke, and _SerializationInvoke (e.g. Type.InvokeMember, MethodInfo.Invoke, ConstructorInfo.Invoke, etc.). These core fcalls may need to be modified to implement the correct semantics for unwrapping nullable types to deliver arguments to methods that expect real nullable values. Given a boxed argument which is of type boxed<T> or null, the fcall must successfully bind to parameters of type nullable<T>. The Reflection APIs accept object types as input, accordingly, there is no way to get the raw nullable<T> through to the implementation and fcalls. This creates two separate problems: (i) deciding whether the provided arguments correctly match a method's parameters; and (ii) performing conversions from null or type T to a nullable<T> when dispatching to a method that takes a nullable<T> as an argument. For example, if you have a method handle for an overload "void foo(int? x)", the code which invokes foo may pass 'x' inside an object array. The act of creating the array will box the argument, resulting in either a boxed int or a null. The reflection code must know to either wrap or unwrap the argument before delivering it to 'foo'. Consider the following exemplary code:

```
int? x = null;
int? y = 10;
MethodInfo m = /*...*/;
object target = /*...*/;
//Reflection sees a boxed<int> being passed to something which takes a Nullable<int>
m.Invoke(target, new object[ ] { x });
//Reflection sees a null being passed to something which takes a Nullable<int>
m.Invoke(target, new object[ ] { y });
```

If the programming language has its own late-binding code (e.g., VB.NET), the programming language may have to handle this problem as well.

In addition, any serializers or deserializers provided by the software development framework may need to be updated to provide deep understanding of the nullable type. Serialization is the process of taking an object and converting it into a format in which it can be transmitted across a network and saved to a storage location. Accordingly, any serializers in the runtime environment may need to have deep knowledge of nullable<T>. The representation of a boxed nullable<T> may confuse a serializer (e.g., when the serializer would like to serialize the raw nullable structure containing the Boolean hasValue and value).

Figure 9:
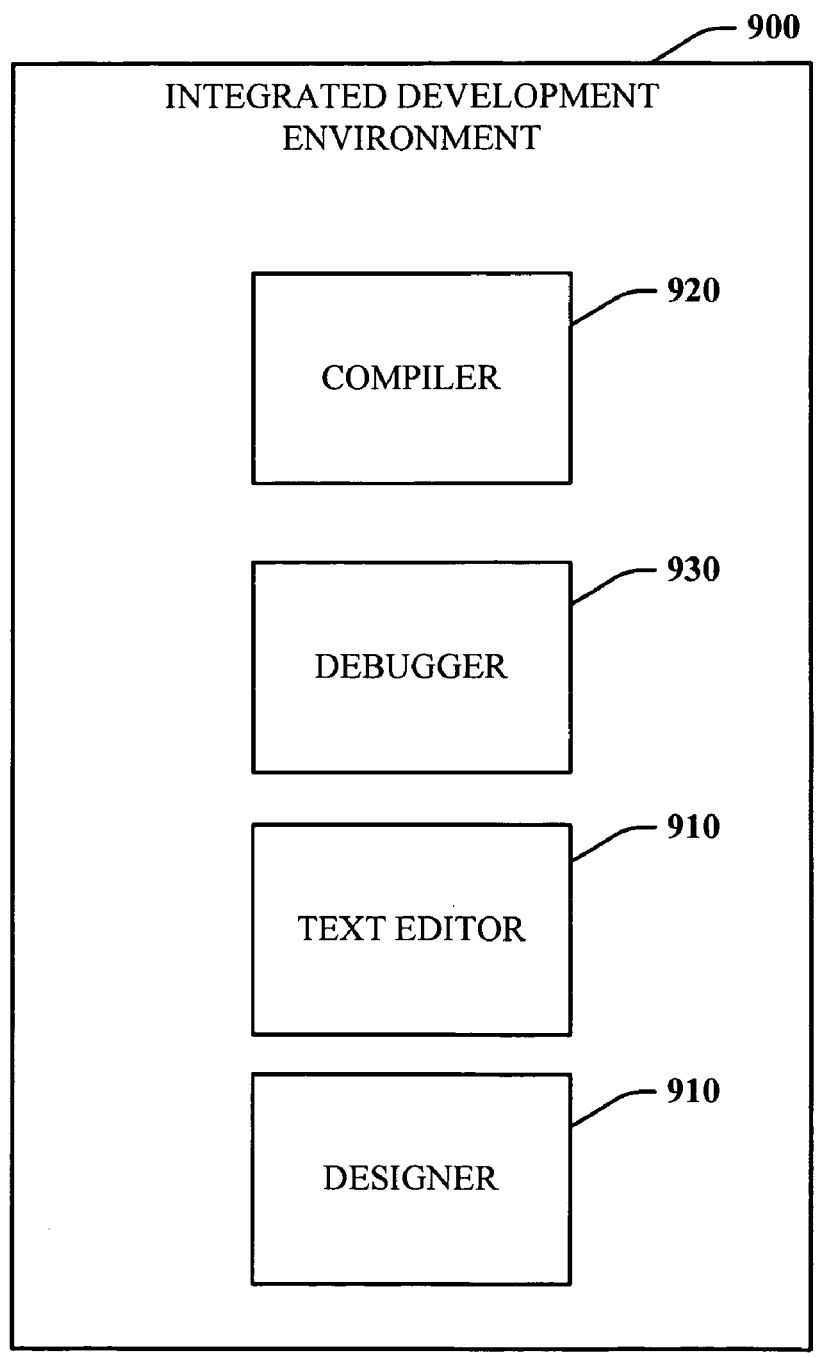
FIG. 9 is a block diagram of an integrated development environment.

Referring now to FIG. 9, for each programming language that includes the nullable type, certain applications may need to be modified to fully support the nullable type. An integrated development environment (IDE) 900 is a set of programs or applications run from a single user interface to provide a set of tools for software development. For example, an IDE 900 often includes a text editor component 910, compiler component 920, debugger component 930 and designer component 940, which are all activated and function from a common user interface. A designer component 940 may facilitate the design and coding of a graphical user interface. The IDE 900, including, but not limited to, the compiler component 920 and debugger component 930 may be modified to support the low level understanding of the nullable type. For example, existing debuggers may not understand that the new physical representation of a nullable<T> is either a boxed<T>, or a null reference.

The subject matter disclosed herein may be implemented as a method, apparatus, or article of manufacture using standard programming and/or engineering techniques to produce software, firmware, hardware, or any combination thereof to control a computer to implement the disclosed subject matter. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring to FIGS. 5 and 6, methodologies relating to supporting nullable types are illustrated. While, for purposes of simplicity of explanation, the methodologies are shown and described as a series of acts, it is to be understood and appreciated that the methodologies are not limited by the order of acts, as some acts may, in accordance with these methodologies, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the following methodologies.

Figure 10:
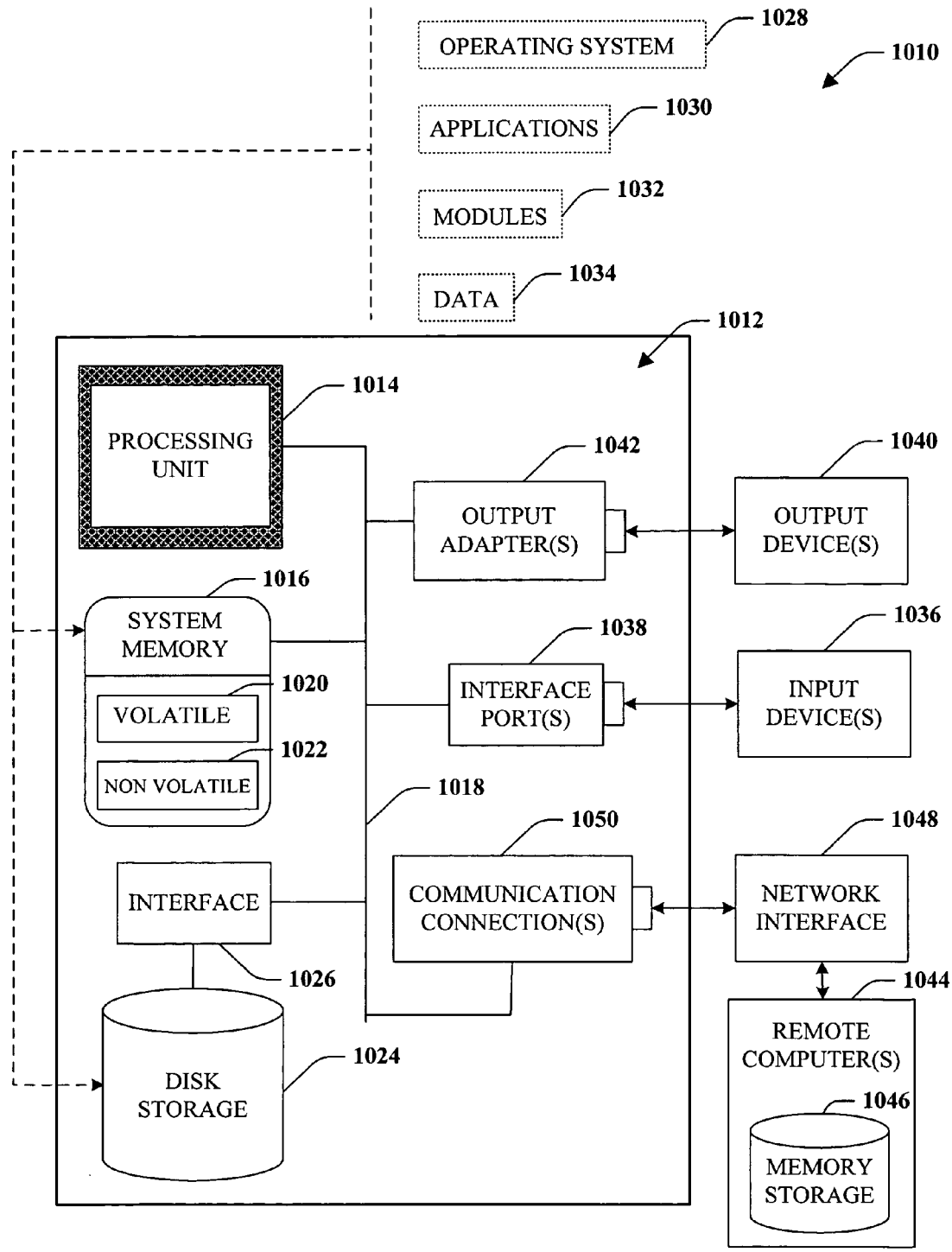
FIG. 10 is a schematic block diagram illustrating a suitable operating environment.
Figure 11:
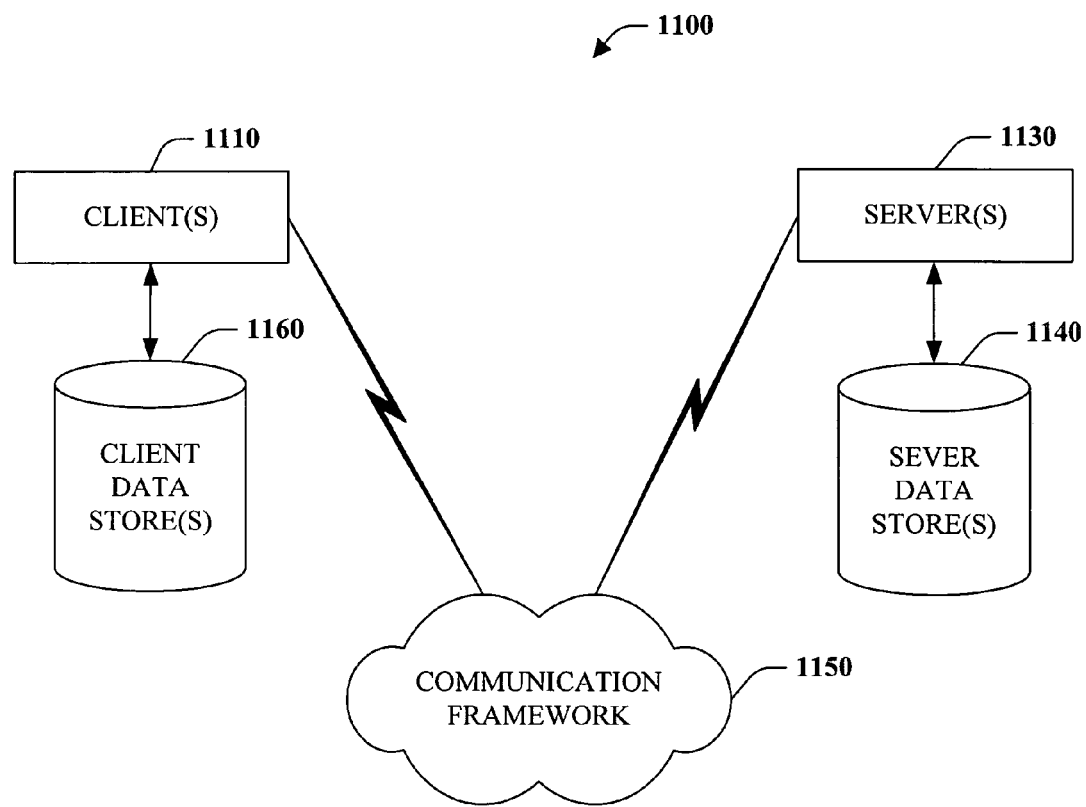
FIG. 11 is a schematic block diagram of a sample computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the claimed subject matter also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the subject matter can be practiced on stand-alone computers. In a distributed computing environment, program modules may be located in both local and remote memory storage devices.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like displays (e.g., flat panel and CRT), speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection(s) 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereof, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems, power modems and DSL modems, ISDN adapters, and Ethernet cards or components.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A computer implemented methodology for providing null support for programming language types, comprising:
    preventing nesting of one nullable type within another type structure at compile time, wherein an instance of the nullable type comprises:
        an underlying value of a type associated with at least one programming language; and
        an indicator value that signals when the instance of the nullable type represents null;
    identifying a nullable type at runtime; and
    providing runtime support for the nullable type, including converting between an instance of the nullable type and an instance of a reference type, and wherein converting the nullable type to the reference type includes unwrapping the instance of the nullable type, generating a reference to the underlying value when the indicator value signals that the instance of the nullable type does not represent null and generating a null reference when the indicator value signals that the instance of the nullable type represents null.

2. The method of claim 1, converting the instance of nullable type to the instance of the reference type such that the dynamic type of the instance of the reference type is the type of the underlying value of the instance of the nullable type.

3. The method of claim 1, converting the instance of the reference type to the instance of the nullable type includes setting the indicator value to signal that the instance of the nullable type represents null when the instance of the reference type is a null reference.

4. The method of claim 1, converting the instance of the reference type to the instance of the nullable type includes setting the indicator value to signal that the instance of the nullable type does not represent null and setting the underlying value to the value of the instance of the reference type when the instance of the reference type is not a null reference.

5. The method of claim 1, the nullable type supports at least one interface of the type of the underlying value.

6. The method of claim 1, providing runtime support comprises providing at least one instruction that inspects at least one of the nullable type and an instance of the nullable type at runtime.

7. The method of claim 1, providing runtime support comprises providing at least one instruction that reifies an instance of the nullable type at runtime.

8. A system embodied on a computer readable storage medium that facilitates null support for programming language types, comprising:
    a nullable type that includes an underlying value of a type associated with at least one programming language and an indicator value that signals when an instance of the nullable type represents null; and a runtime component that provides runtime support for the nullable type, wherein the runtime component prevents execution of instances of a nullable type nested within another nullable type, and wherein the runtime component includes an identifier component that identifies the instance of the nullable type, and a conversion component that provides conversion between an instance of the nullable type and an instance of a reference type, and wherein conversion of the instance of the nullable type to an instance of a reference type includes unwrapping the instance of the nullable type, generating a reference to the underlying value when the indicator value signals that the instance of the nullable type does not represent null and generating a null reference when the indicator value signals that the instance of the nullable type represents null.

9. The system of claim 8, the conversion component provides for the conversion of the instance of the reference type to at least one of the instance of the nullable type and an instance the type of the underlying value.

10. The system of claim 9, the conversion component sets the indicator value of the instance of the nullable type to represent null when an instance of a reference type is a null reference.

11. The system of claim 8, the runtime component provides instructions to inspect at least one of the nullable type and an instance of the nullable type at runtime.

12. The system of claim 8, further comprising at least one of:

a compiler component that compiles source code including the nullable type;

a text editor component; and a debugger component that provides a software developer with a tool to evaluate source code including the nullable type.

13. A system embodied on a computer readable storage medium for facilitating null support for programming language types, comprising:

a nullable type that includes an underlying value of a type associated with at least one programming language and an indicator value that signals when an instance of the nullable type represents null;

means for preventing nesting of one nullable type within another nullable type structure at compile time;

means for providing runtime support for the nullable type;

means for identifying the instance of the nullable type; and means for converting the instance of the nullable type to an instance of a reference type by unwrapping the instance of the nullable type, wherein unwrapping the instance of the nullable type includes generating a reference to the underlying value when the indicator value signals that the instance of the nullable type does not represent null and generating a null reference when the indicator value signals that the instance of the nullable type represents null.

14. The system of claim 13, further comprising:

means for converting the instance of the reference type to the instance of the nullable type by setting the indicator value to signal that the instance of the nullable type represents null when the instance of the reference type is a null reference, and setting the indicator value to signal that the instance of the nullable type does not represent null and setting the underlying value to the value of the instance of the reference type when the instance of the reference type is not a null reference.

* * * * *